(12) United States Patent
Kim (10) Patent No.: US 9,606,842 B2
(45) Date of Patent: Mar. 28, 2017

(54) RESOURCE AND CORE SCALING FOR IMPROVING PERFORMANCE OF POWER-CONSTRAINED MULTI-CORE PROCESSORS

(71) Applicant: Wisconsin Alumni Research Foundation, Madison, WI (US)

(72) Inventor: Nam Sung Kim, Middleton, WI (US)

(73) Assignee: National Science Foundation, Arlington, VA (US)

( * ) Notice: Subject to any disclaimer, the term of this patent is extended or adjusted under 35 U.S.C. 154(b) by 500 days.

(21) Appl. No.: 13/889,577

(22) Filed: May 8, 2013

(65) Prior Publication Data

US 2014/0337853 A1    Nov. 13, 2014

(51) Int. Cl.
*G06F 9/46* (2006.01)
*G06F 9/50* (2006.01)

(52) U.S. Cl.
CPC .......... *G06F 9/5094* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 7,996,346 B2 * | 8/2011 | Bell et al. | 706/25 |
| 2006/0005082 A1 * | 1/2006 | Fossum et al. | 714/42 |
| 2006/0090161 A1 * | 4/2006 | Bodas et al. | 718/100 |
| 2008/0134185 A1 * | 6/2008 | Fedorova | 718/102 |
| 2009/0037697 A1 * | 2/2009 | Ramani et al. | 712/214 |
| 2010/0125677 A1 * | 5/2010 | Bouvier | 710/5 |
| 2011/0029760 A1 * | 2/2011 | Elmer et al. | 712/209 |
| 2011/0113199 A1 * | 5/2011 | Tang et al. | 711/130 |
| 2011/0239220 A1 * | 9/2011 | Gibson et al. | 718/103 |
| 2012/0260258 A1 * | 10/2012 | Regini et al. | 718/104 |
| 2013/0211752 A1 * | 8/2013 | Shi et al. | 702/61 |
| 2013/0311812 A1 * | 11/2013 | Bose et al. | 713/340 |

(Continued)

OTHER PUBLICATIONS

J. Lee, et al., "Improving Throughput of Power-Constrained GPUs Using Dynamic Voltage/Frequency and Core Scaling," ACM PACT, 2011, pp. 111-120.

(Continued)

*Primary Examiner* — Emerson Puente
*Assistant Examiner* — Mehran Kamran
(74) *Attorney, Agent, or Firm* — Boyle Fredrickson, S.C.

(57) ABSTRACT

A multi-core processor provides circuitry for jointly scaling the number of operating cores and the amount of resources per core in order to maximize processing performance in a power-constrained environment. Such scaling is advantageously provided without the need for scaling voltage and frequency. Selection of the number of operating cores and the amount of resources per core is made by examining the degree of instruction and thread level parallelism available for a given application. Accordingly, performance counters (and other characteristics) implemented in by a processor may be sampled on-line (in real time) and/or performance counters for a given application may be profiled and characterized off-line. As a result, improved processing performance may be achieved despite decreases in core operating voltages and increases in technology process variability over time.

14 Claims, 5 Drawing Sheets

(56) References Cited

U.S. PATENT DOCUMENTS

2014/0019984 A1* 1/2014 Li et al. .................... 718/102
2014/0201761 A1* 7/2014 Dalal et al. ................ 718/108
2014/0259024 A1* 9/2014 Sridharan et al. ........... 718/106
2014/0331234 A1* 11/2014 Gibson et al. ............... 718/103

OTHER PUBLICATIONS

J. Li and J.F. Martinez, "Dynamic power-performance adaptation of parallel computation on chip multiprocessors," IEEE/ACM HPCA, 2006, pp. 77-87.
V. Kontorinis, et al., "Reducing peak power with a table-driven adaptive processor core," IEEE/ACM MICRO, 2009, pp. 189-200.
D. Albonesi et al., "Dynamically Tuning Processor Resources with Adaptive Processing," IEEE Computer, vol. 36, No. 12, Dec. 2003, pp. 49-58.
A. Iyer and D. Marculescu, "Microarchitecture-level power management," IEEE TVLSI, vol. 10, No. 3, Jun. 2003, pp. 230-239.

* cited by examiner

FIG. 1

LOWER V/F

FIG. 2A

HIGHER V/F

FIG. 2B

HIGHER V/F

FIG. 2C

HIGHER V/F

RESOURCE AND CORE SCALING FOR IMPROVING PERFORMANCE OF POWER-CONSTRAINED MULTI-CORE PROCESSORS

This invention was made with government support under 0953603 and 1016262 awarded by the National Science Foundation. The government has certain rights in the invention

BACKGROUND OF THE INVENTION

The present invention relates to multi-core processors, and, in particular, to systems and methods for maximizing performance of multi-core processors in power-constrained environments.

Modern computer processors typically include multiple central processing unit ("CPU") cores for executing one or more applications comprised of instruction code. Such multi-core processors may contain anywhere from a few cores to a large number of cores depending on the architecture and the technology process used.

Each core in a multi-core processor is typically capable of reading and executing a sequence of instruction code known as a thread. Within each thread, a core may also execute instructions in parallel and/or out of order to maximize performance to the extent that instruction interdependencies allow. This is known as instruction level parallelism ("ILP"). In general, the more resources a core has the higher the performance may be for applications with code presenting high instruction level parallelism.

Additionally, multiple cores may be used to each execute multiple threads of an application at the same time. This is known as thread level parallelism ("TLP"). In general, the more cores a multi-core processor has the more threads it may concurrently execute for applications presenting high thread level parallelism.

Multi-core processors typically operate at a particular voltage and frequency. In general, higher processor performance may be achieved by operating the processor at a higher frequency, and higher frequencies typically require operating the processor at a higher voltage. In other words, processor performance is typically related to frequency and, proportionally, to voltage.

Multi-core processors also typically operate in power-constrained environments with a maximum power budget. Consequently, processor performance, as determined by the maximum operating voltage and frequency, is typically limited by a predetermined maximum amount of power. In such cases, raising the voltage and frequency any further would often result in exceeding the maximum amount of power.

In addition, fully operating all cores available in a multi-core processor, and all resources available per core, such as an instruction queue, a physical register file, a re-order buffer, a load-store-queue, caches and execution units, may result in exceeding the maximum amount of power. If the maximum amount of power is exceeded, the processor may exhibit failures and/or become susceptible to damage.

Dynamically scaling processor voltage and frequency is a known method for providing power management for processors operating in such power-constrained environments. Under such voltage/frequency scaling methods, voltage and frequency may each be dynamically reduced at particular times to conserve power. This may, in turn, allow a processor to increase the number of operating cores, thereby improving the performance of applications exhibiting high thread level parallelism in power-constrained environments.

However, as the ability for voltage and frequency scaling lessens due to decreases in nominal core operating voltages and increases in manufacturing process variations, meeting a maximum power budget via voltage and frequency scaling becomes far more challenging and less feasible.

SUMMARY OF THE INVENTION

The present invention provides an improved solution for providing maximum processing performance while still meeting a maximum power budget for multi-core processors operating in a power-constrained environment. In particular, joint scaling of both the number of operating cores and the amount of resources per core is provided. Selection of the number of operating cores and the amount of resources per core is made by examining the degree of instruction and thread level parallelism available for a given application. As such, performance counters (and other characteristics) implemented by a processor may be sampled on-line (in real time) and/or performance counters for a given application may be profiled and characterized off-line. An application may be run, for example, using every possible core and resource-per-core configuration (or any subset thereof) and optimal configurations may be determined prior to deploying the application for use in the field. Performance counters may measure, for example, how often specific events occur in a core or processor, such as how many instructions are executed per cycle, the length of execution time and cache hit rate. Accordingly, such performance counters may be used to indicate how much instruction and thread level parallelism a given application exhibits at each execution interval.

Accordingly, improved processing performance may be achieved by jointly and selectively scaling core and resource configurations for a given application. This may be done independent of voltage and frequency scaling. As such, improved performance may be achieved within a power-constraint. In addition, this also improves performance over simply scaling resources uniformly without consideration for exploiting instruction parallelisms.

Specifically the present invention provides a processor for operating in a power-constrained environment comprising a plurality of central processing unit cores for executing one or more applications. Each core comprises compute resources including an instruction queue, a physical register file, a re-order buffer, a load-store-queue, caches and execution units. There is circuitry for selectively enabling one or more of the plurality of cores and circuitry for selectively scaling the resources available in each core independent of disabling and enabling the entire cores. The number of cores selectively enabled and the amount of resources selectively scaled are determined according to instruction level parallelism and thread level parallelism presented by the application and according to an available power budget.

The amount of instruction level parallelism and thread level parallelism presented by the application may be determined by sampling one or more performance counters on-line and/or profiling and characterizing a given application off-line.

It is thus a feature of at least one embodiment of the invention to measure accessible processor features for determining core and resource configurations.

Performance counters may indicate instructions per cycle, execution time, cache hit rate, and/or utilization of core resources such, as a physical register file, a re-order buffer, a load-store-queue, caches over execution intervals, and so forth.

It is thus a feature of at least one embodiment of the invention to account for how efficiently a given amount of cores and/or resources-per-core are used in determining core and resource configurations.

Scaling of resources may be determined according to the instruction level parallelism presented by the application (i.e., how efficiently each resource in a core is utilized by the application). In addition, resources in each core may be increased with greater instruction level parallelism.

It is thus a feature of at least one embodiment of the invention to determine an optimal resource configuration for exploiting available instruction level parallelism for a given application in a given execution interval.

The number of cores selectively enabled may be determined according to the amount of thread level parallelism presented by the application. In addition, the number of cores may be increased with greater thread level parallelism.

It is thus a feature of at least one embodiment of the invention to determine an optimal core configuration for exploiting available thread level parallelism.

Execution units may further comprise arithmetic logic units and/or floating point logic units. In addition, resources available for selective scaling may a branch target buffer and a translation look-aside buffer.

It is thus a feature of at least one embodiment of the invention to flexibly scale varying types of micro-architectural resources within each core.

These particular features and advantages may apply to only some embodiments falling within the claims and thus do not define the scope of the invention.

DETAILED DESCRIPTION OF THE PREFERRED EMBODIMENT

Figure 1:
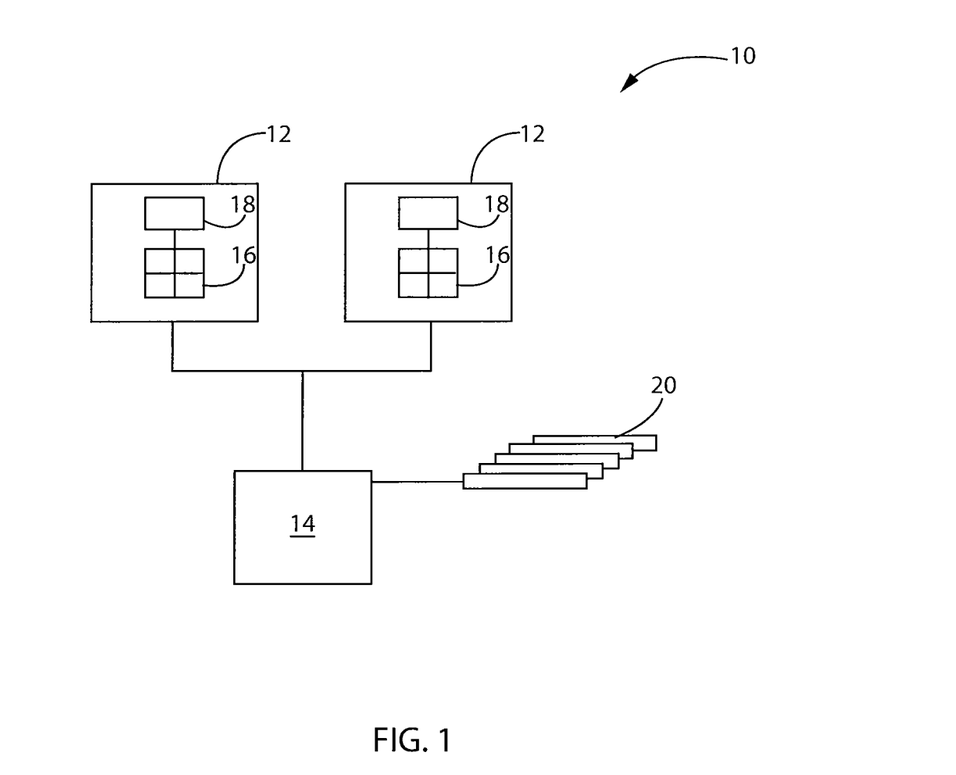
FIG. 1 is a diagram illustrating two multi-core processor modules coupled together via a chipset in accordance with an embodiment of the invention.

Referring now to FIG. 1, a multi-processor system 10 comprises two multi-core processor modules 12 coupled together via a chipset 14. The chipset 14 may, in turn, couples to a system memory 20, other system components and/or other systems. Each multi-core processor module 12 may comprise, for example, a multi-core processor 16 and a Level 3 ("L3") cache 18 for storing instruction code and data. Each multi-core processor 16 may comprise, for example, four central processing unit cores for executing one or more applications. Alternative embodiments may vary the number of processors, the number of cores per processor and the configuration of chipsets, caches, memories and additional processors and system components without departing from the scope of the invention.

Each multi-core processor 16 is manufactured from a particular technology process, such as a 32 nm CMOS manufacturing process. As a result, each multi-core processor 16 may typically operate at a particular frequency (such as 3.2 GHz) with a particular nominal core operating voltage (such as 0.9 Volts). Consequently, each multi-core processor 16 must operate within a maximum available power budget (such as 90 Watts). However, fully enabling all cores and all resources per core at the maximum voltage and frequency the manufacturing process may allow would result in exceeding the maximum available power budget. This may, in turn, cause the multi-core processor 16 to exhibit failures and/or become susceptible to damage.

To exploit instruction level parallelism inherent in applications, each multi-core processor 16 is designed to execute multiple in-flight instructions in an out-of-order fashion. The more resources a particular core has, the higher the performance may be for applications with high instruction level parallelism running on that core. Similarly, the more cores a processor has, the more threads the processor may concurrently run for applications with high thread level parallelism.

In modern processors, such as multi-core processors 16, key architectural resources, such as on-chip caches, buffers, queues and execution units, are designed in a modular fashion so that their size or width can be easily adapted for derivative architectures targeting various market segments (e.g., mobile, desktop and server). These on-chip memory structures are typically comprised of multiple arrays, and each array is equipped with a local power-gating device, and/or in some instances a clock-gating device, that can turn the array on or off independently. Accordingly, the number of operating resources can be varied by fine-grain power-gating and/or clock-gating, and the number of operating cores may be similarly scaled.

Figure 2A:
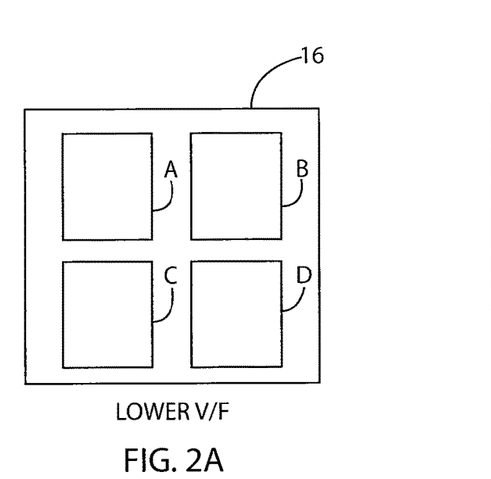
FIG. 2A is a diagram illustrating a fully enabled multi-core processor operating with a lower voltage and frequency.

Referring now to FIGS. 2A-2D, the multi-core processor 16 is shown in various exemplar configurations with cores individually labeled "A," "B," "C" and "D." As a point of reference, FIG. 2A depicts cores "A," "B," "C" and "D" fully enabled with all resources operating. As a result of such full operation, in order to avoid exceeding the maximum available power budget, cores "A," "B," "C" and "D" must also operate at a reduced voltage and frequency. However, as the ability for voltage and frequency scaling lessens in future processors due to decreases in core operating voltages and increases in manufacturing process variations, meeting a maximum power budget via voltage and frequency scaling becomes far more challenging and less feasible. Exemplar FIGS. 2B-2D now demonstrate techniques for achieving higher application performance in accordance with embodiments of the invention.

Figure 2B:
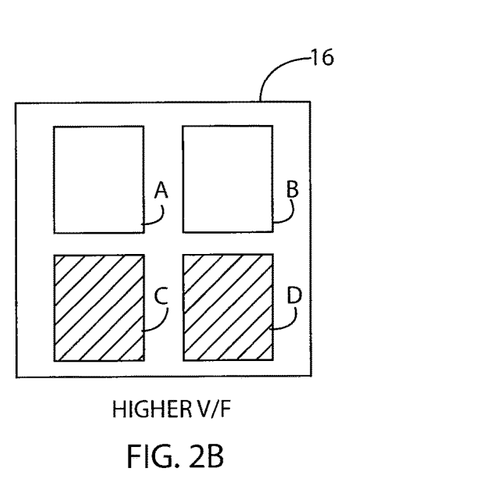
FIG. 2B is a diagram illustrating core scaling in a multi-core processor operating with a higher voltage and frequency in accordance with an embodiment of the invention.

Referring now to FIG. 2B, in accordance with an embodiment of the invention, and by way of example, core scaling is used to deactivate cores "C" and "D" while leaving cores "A" and "B" fully activated. This results in reduced power consumption by the multi-core processor 16 over FIG. 2A.

As a result, this allows an increase of voltage and frequency for cores "A" and "B" within the available power budget. Accordingly, improved performance for cores "A" and "B" may be realized. This arrangement may be well suited for achieving higher performance in applications having higher instruction level parallelism (favoring more resources) and lower thread level parallelism.

Figure 2C:
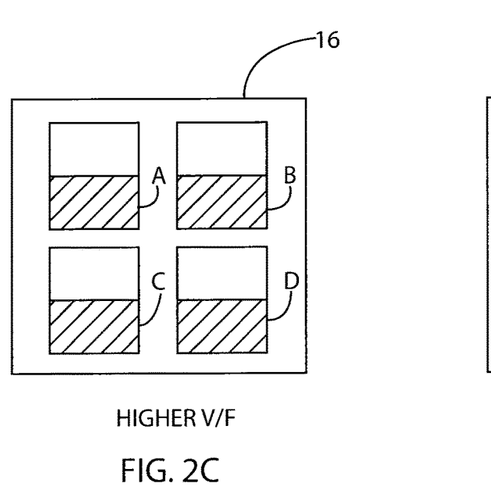
FIG. 2C is a diagram illustrating resource scaling in a multi-core processor operating with a higher voltage and frequency in accordance with an embodiment of the invention.

Referring now to FIG. 2C, in accordance with an embodiment of the invention, and by way of example, the multi-core processor 16 is shown again, now implementing resource scaling. Here, resource scaling is used to half-way activate the resources for each core "A," "B," "C" and "D." This again results in reduced power consumption by the multi-core processor 16 over FIG. 2A. As a result, this allows an increase of voltage and frequency for cores "A," "B," "C" and "D" within the available power budget. Accordingly, improved performance for cores "A," "B," "C" and "D" may be realized. This arrangement may be well suited for achieving higher performance in applications having higher thread level parallelism (favoring more cores) and lower instruction level parallelism.

Figure 2D:
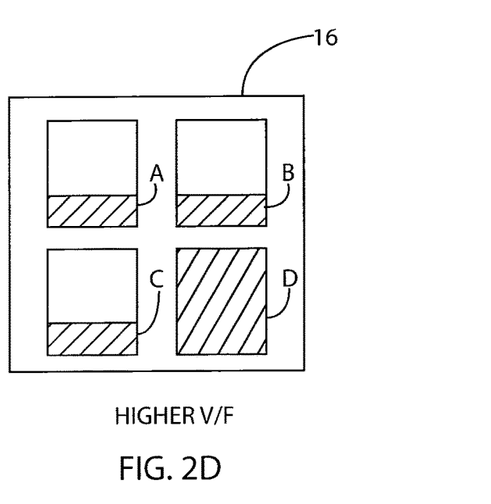
FIG. 2D is a diagram illustrating core and resource scaling in a multi-core processor operating with a higher voltage and frequency in accordance with an embodiment of the invention.

Finally, referring now to FIG. 2D, in accordance with an embodiment of the invention, and by way of example, the multi-core processor 16 is shown again, now jointly implementing core and resource scaling. Here, core and resource scaling are used together to partially activate the resources of cores "A," "B" and "C" and deactivate core "D" entirely. This again results in reduced power consumption by the multi-core processor 16 over FIG. 2A. As a result, this allows an increase of voltage and frequency for cores "A," "B" and "C" within the available power budget. Accordingly, improved performance for cores "A," "B" and "C" may be realized. In addition, with the deactivation of core "D," more resources may be active in cores "A," "B" and "C" as compared to FIG. 2C.

This arrangement exemplifies a more complex balance between instruction level and thread level parallelism as presented by the application. As it may now be apparent, in accordance with embodiments of the invention, operating under a particular power-constraint, some cores and/or certain resources per core may be disabled to allow allocating more power to the enabled cores. As a result, the enabled cores may operate with higher voltage and frequency, resulting in greater overall performance. It will be appreciated that other varying configurations of core and resource scaling may similarly be implemented to maximize performance under a power-constraint by exploiting instruction and thread level parallelisms.

Figure 3:
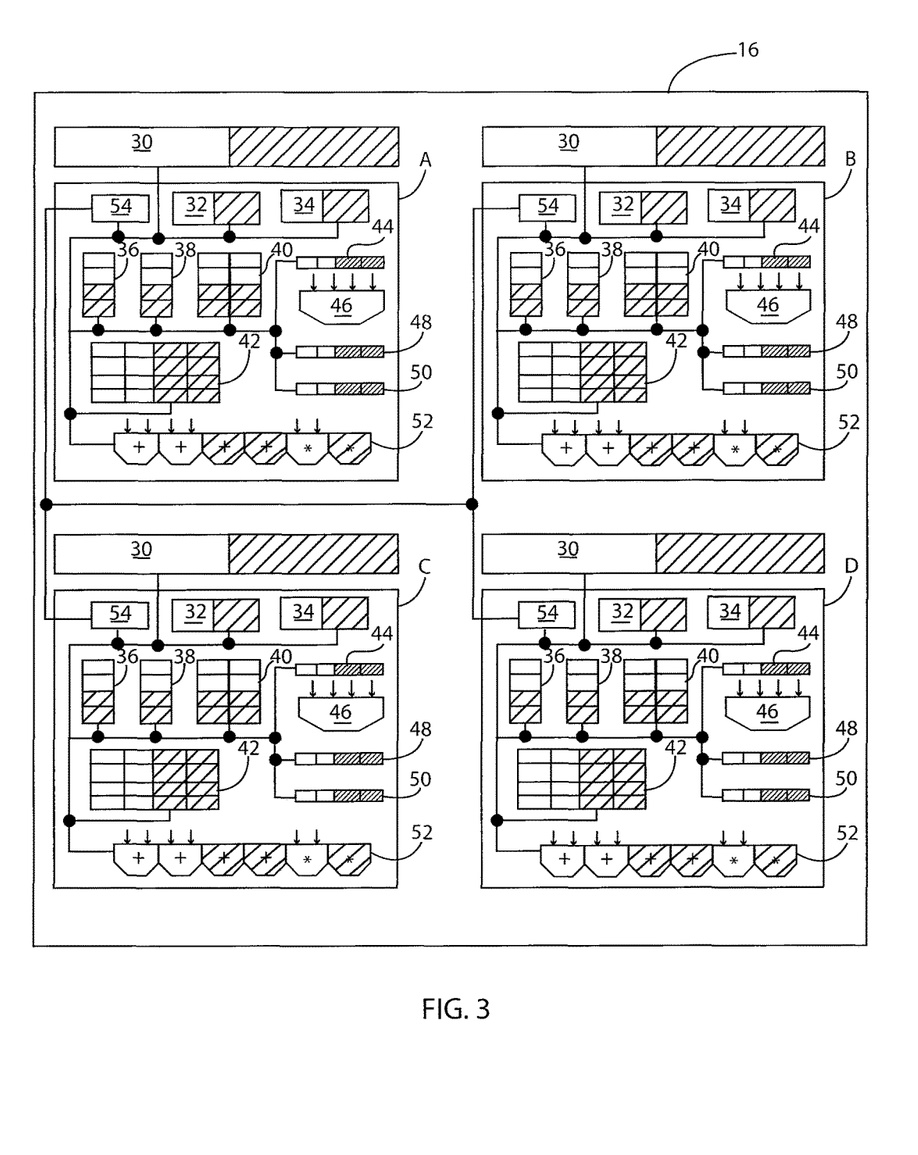
FIG. 3 is diagram illustrating multi-core processor resources and core and resource scaling to achieve a higher voltage and frequency in accordance with an embodiment of the invention.

Referring now to FIG. 3, each of the cores "A," "B," "C" and "D" of the multi-core processor 16 comprise various scalable resources in accordance with an embodiment of the invention. Resources include, for example, a shared 8 MB (16-entry Miss-Status Handling Register) Level 2 ("L2") cache 30, a private 32 KB instruction Level 1 ("IL1") cache 32, a private 32 KB data Level 1 ("DL1") cache 34, a 2 KB branch target buffer ("BTB") 36, a 32-entry instruction and 32-entry data translation look-aside buffer ("TLB") 38, a 32-entry load and 32-entry store queue ("LSQ") 40, a physical register file ("PRF") 42 comprising 224 integer registers and 192 floating point registers, a 32-entry instruction queue ("IQ") 44, a decoder 46, a 64-entry re-order buffer ("ROB") 48 and multiple execution units 52. The execution units 52 may comprise arithmetic logic units and/or floating point logic units.

In one embodiment, circuitry 54 is in communication with resources in the local core, such as L2 cache 30, IL1 cache 32, DL1 cache 34, BTB 36, TLB 38, the LSQ 40, PRF 42, IQ 44, ROB 48 and execution units 52 in core "A." In addition, circuitry 54 is in communication with similar circuitry in each other core of the four central processing unit cores 16. As such, circuitry 54 may receive performance information from resources among the cores "A," "B," "C" and "D" and may selectively enable the cores "A," "B," "C" and "D" and/or scale resources as desired. In other words, the functionality of circuitry 54 may be localized or distributed among the cores as desired.

Figure 4:
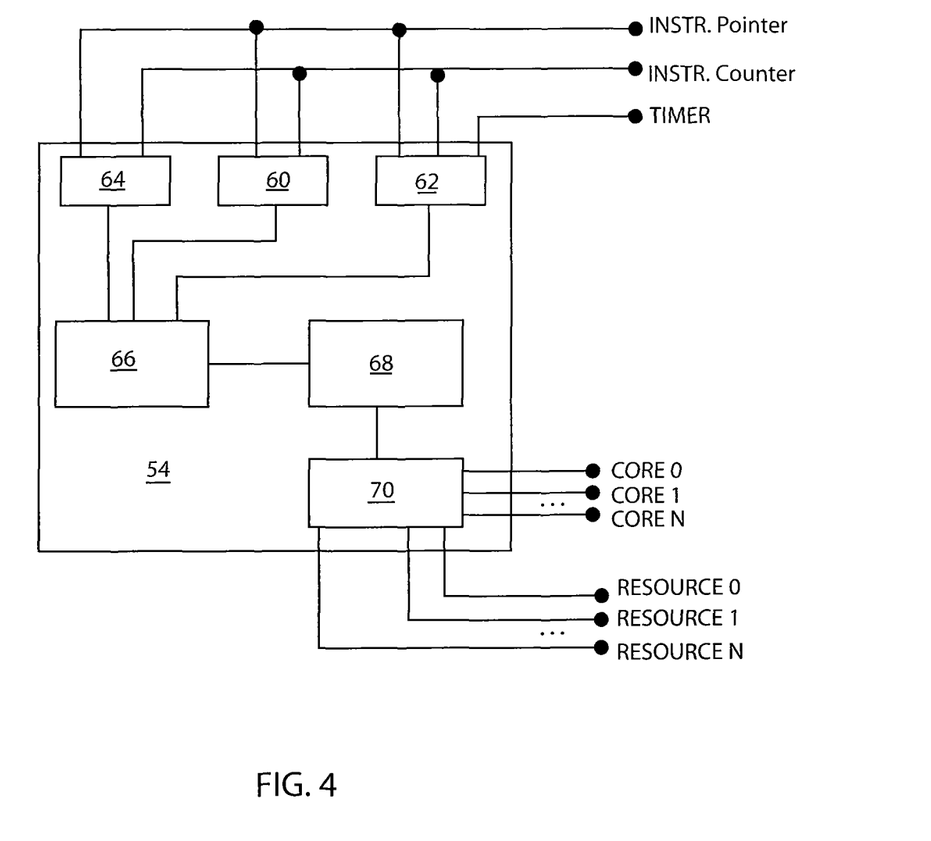
FIG. 4 is diagram illustrating circuitry for providing core and resource scaling in accordance with an embodiment of the invention.

Referring now to FIG. 4, exemplar circuitry 54 provides core and resource scaling for multi-core processor 16 in accordance with an embodiment of the invention. Circuitry 54 implements a low-overhead runtime algorithm for effectively managing the core and resource scaling to maximize performance. At runtime, circuitry 54 samples performance counters, such as instruction per cycle ("IPC") 60, by monitoring the instruction pointer and/or instruction counter, and execution time ("ET") 62, by monitoring a timer, the instruction pointer and/or instruction counter, for each supported core and resource configuration satisfying the power-constraint. Performance counters are implemented in a core or a processor and measure how often specific events occur in a core or a processor, such as how many instructions are executed per cycle, the length of execution time and cache hit rate. Accordingly, such performance counters may be used to indicate how much instruction and thread level parallelism a given application exhibits at each execution interval.

Instruction per cycle may be considered the number of instructions that may be executed by a core in one clock cycle. Execution time may be considered the actual time to execute one or more instructions. Higher instructions per cycle may not directly result in a lower execution time, however, due to, for example, the execution of synchronization instructions (e.g., spin instructions). Additionally, other performance counters, such cache hit rate/cache miss rate, "misses per kilo-instruction" (misses per thousand instructions, or "MPKI") 64, or others as understood in the art, may also be similarly sampled.

By way of example, an evaluator 66, in turn, may perform calculations to determine optimal performance configurations based on the core and resource configuration as measured by the performance counters, such as IPC 60, ET 62 and MPKI 64. The evaluator 66 may analyze the impact of core and resource scaling on performance and power consumption of the multi-core processor 16 running a current application. For example, in an embodiment, the evaluator 66 may calculate instructions per cycle, via IPC 60, divided by execution time, via ET 62, over one or more sample intervals for each supported core and resource configuration satisfying the power-constraint. A configuration yielding greater instructions per cycle and lesser execution time, while still satisfying the power-constraint, may be determined.

As the number of sampled intervals used to determine performance increases, the variance of the performance counters across intervals decreases, while the processor runs for a longer time with suboptimal core and resource configurations. To minimize diminishing the proposed technique, the number of intervals for observing performance counters for each configuration should be minimized. Accordingly, in one embodiment, IPC 60 and ET 62 may be considered for each interval to signify the performance difference across intervals and between configurations as performance counters.

The evaluator 66 may also prioritize architectural resources for resource scaling based on their power efficiency (i.e., performance divided by power) changes after scaling their resources, and the complexity of implementing the resource scaling. In an embodiment, resource scaling may be limited to only architectural components that exhibit large power reductions with small performance degradations. For example, PRF 42 might not be scaled at all as scaling register files typically does not decrease power consumption by a considerable amount but does decrease performance. In another embodiment, resources such as TLB 38, LSQ 40, IQ 44 and ROB 48 might only be scaled in multi-core processors with a large number of cores (i.e., 8 or more cores).

The evaluator 66 may then, in turn, reference a core and resource index 68, which may, in turn, derive a core and resource configuration. In one example, the index 68 may provide a set of predefined resource and core settings each selected to make significant differences in power usage with modest performance degradation (as described above) and to provide for a range of different combinations of core activations with different degrees of resource activation within each of the cores that are activated within the desired power-constraints. This index 68 may be unique to a given processor as determined empirically by the manufacturer.

The evaluator 66 and the index 68 may operate, in one embodiment, to rank these different resource settings according to those that favor ILP versus TLP and the measurements received by the evaluator 66 may be used to deduce whether the current execution environment favors ILP versus TLP and make the selection accordingly either through explicit empirically arrived formula or by incremental adjustment and evaluation. For example, high IPC values for a given ET may indicate a program that favors ILP suggesting an increase in resources whereas low IPC values for a given ET may indicate a program that favors TLP suggesting an increase in cores.

Alternatively, different resource and core settings may be tried during runtime (for example randomly) and performance counters measured. Then this resource and core setting may be adopted for a predetermined period of time before which another experiment is performed to determine the best resource setting. The performance counter may indicate, for example, execution time, instructions per cycle, cache misses per thousand instructions, or various other combinations of these values or other micro-architectural values. Execution time divided by instructions per cycle appears to provide a good evaluation of the resource settings; however, the invention is not limited to such use of particular counters.

The core and resource index 68 may, in turn, implement a core and resource configuration via driver 70. The driver 70 may realize core and resource scaling throughout the local core (or multi-cores) via power gating and/or clock gating techniques as described above. Accordingly, improved performance may be achieved within a power-constraint. It will be appreciated that one or more aspects of circuitry 54 may be equivalently implemented via microcode and/or software without departing from the scope of the invention.

Figure 5:
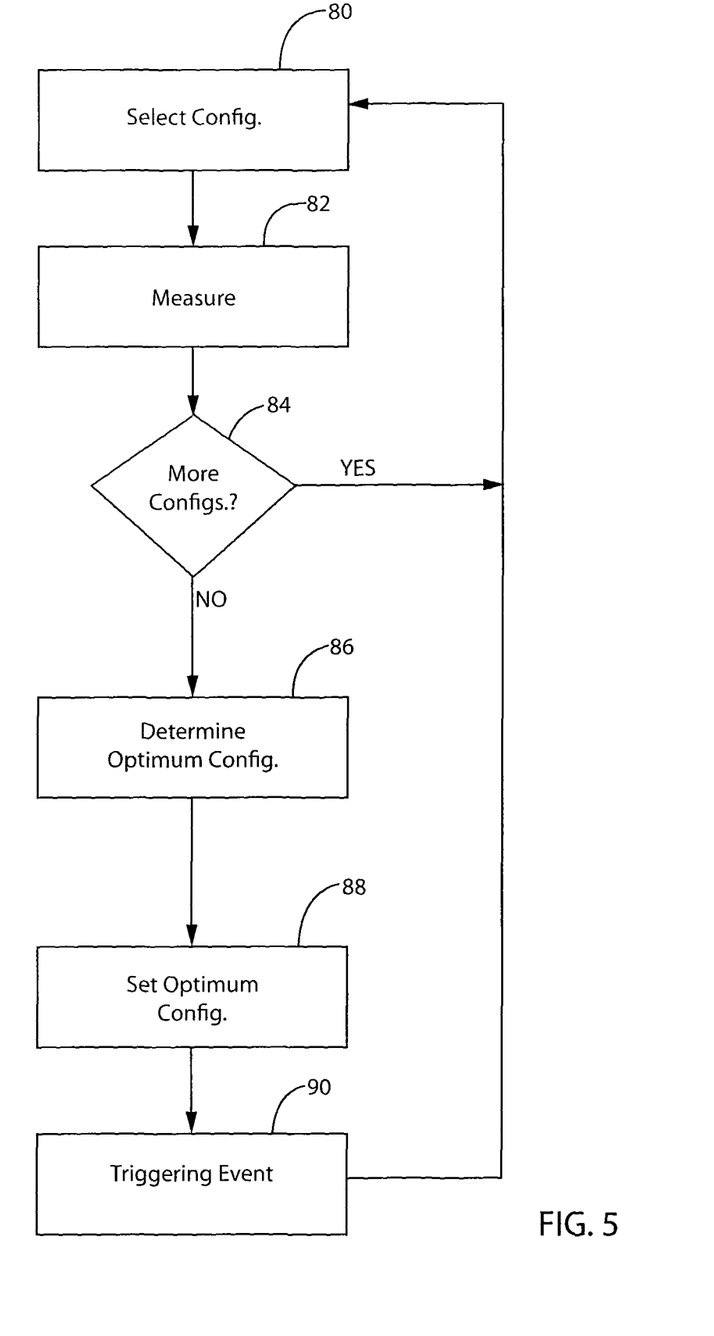
FIG. 5 is a flow chart illustrating determination of core and resource scaling in accordance with an embodiment of the invention.

Referring now to FIG. 5, a flow chart illustrating the determination of core and resource scaling in accordance with an embodiment of the invention is shown. In block 80, a particular core and resource configuration meeting the maximum available power budget is selected. Next, in block 82, performance counters, such as IPC 60, ET 62, MPKI 64 and/or others, are measured for the core and resource configuration selected for one or more sample intervals, such as an interval of three clock cycles.

Next, in decision block 84, the number of possible core and resource configurations meeting the maximum available power budget may be considered, and if there are more core and resource configurations available for comparison, the process returns to block 80 to select the next configuration, and then to block 82 to measure the corresponding configuration. Each of these loops through process block 80, 82 and decision block 84 constitutes an experiment to determine the best resource and core configuration. On the other hand, if there are no further core and resource configurations to be considered, in block 86, the optimum core and resource configuration for achieving the highest performance while staying within the maximum power budget is determined. In one embodiment, this determination is made by calculating instructions per cycle, such as via IPC 60, divided by execution time, such as via ET 62, over one or more sample intervals for each support core and resource configuration satisfying the power-constraint.

Next, in block 88, the optimum core and resource configuration is selected. Optionally, a triggering event 90 may then be monitored for repeating the determination process described above once again. For example, at a subsequent point in time, such as after a change in program applications or threads, upon reaching a particular power consumption level, or cache hit rate, or cache miss rate, after reaching a predetermined period amount time, and so forth, the triggering event 90 may start the process again at block 80.

One or more specific embodiments of the present invention have been described above. It is specifically intended that the present invention not be limited to the embodiments and/or illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor" can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

All of the publications described herein including patents and non-patent publications are hereby incorporated herein by reference in their entireties.

What is claimed is:

1. A processor for operating in a power-constrained environment comprising:
    a plurality of central processing unit cores for executing one or more applications, each core comprising compute resources including caches and execution units, each core being configured to receive an operating voltage;
    circuitry for selectively enabling one or more of the plurality of cores; and
    circuitry for selectively scaling one or more of the resources available in each core independent of disabling and enabling the entire cores,
    wherein the processor is configured to determine an amount of instruction level parallelism and an amount of thread level parallelism presented by the one or more applications,
    wherein the amount of instruction level parallelism and thread level parallelism are determined by sampling one or more counters for a given application, the one or more counters indicating instructions per cycle and execution time, and
    wherein the processor is configured to disable one or more of the cores according to the determined amount of thread level parallelism while scaling one or more of the resources available in one or more of the cores according to the determined amount of instruction level parallelism independent of scaling the operating voltage and frequency.

2. The processor of claim 1, wherein a first performance counter indicates the instructions per cycle.

3. The processor of claim 1, wherein a second performance counter indicates the execution time.

4. The processor of claim 1, wherein a second performance counter indicates cache hit rate.

5. The processor of claim 1, wherein resources are increased with greater instruction level parallelism.

6. The processor of claim 1, wherein the number of cores is increased with greater thread level parallelism.

7. The processor of claim 1, wherein execution units comprise arithmetic logic units.

8. The processor of claim 1, wherein execution units comprise floating point logic units.

9. The processor of claim 1, wherein resources further include a branch target buffer and a translation look-aside buffer.

10. The processor of claim 1, wherein, resources further include an instruction queue, a physical register file, a re-order buffer and a load-store-queue.

11. A method for operating a processor in a power-constrained environment, the processor including a plurality of central processing unit cores for executing one or more applications, each core comprising compute resources including caches and execution units, and each core receiving an operating voltage, the method comprising:
    determining an amount of instruction level parallelism and an amount of thread level parallelism presented by the one or more applications;
    selectively enabling one or more of the cores for executing the one or more applications; and
    disabling at least one of the cores according to the determined amount of thread level parallelism while selectively scaling one or more of the resources available in the one or more enabled cores according to the determined amount of instruction level parallelism independent of scaling the operating voltage and frequency,
    wherein the amount of instruction level parallelism and thread level parallelism are determined by sampling one or more counters for a given application, the one or more counters indicating instructions per cycle and execution time.

12. The method of claim 11, further comprising sampling performance first and second counters that indicate instructions per cycle and execution time, respectively.

13. The method of claim 11, further comprising sampling performance counters for a given application off-line.

14. The method of claim 11, further comprising dividing instructions per cycle by execution time.

* * * * *